United States Patent
Vija et al.

(10) Patent No.: US 8,958,622 B2
(45) Date of Patent: Feb. 17, 2015

(54) EFFICIENT POINT SPREAD FUNCTION MODEL FOR MULTI-CHANNEL COLLIMATOR IN PHOTON IMAGING INCLUDING EXTRA-GEOMETRIC PHOTONS

(71) Applicants: Alexander Hans Vija, Evanston, IL (US); James C Sanders, III, Chicago, IL (US)

(72) Inventors: Alexander Hans Vija, Evanston, IL (US); James C Sanders, III, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 86 days.

(21) Appl. No.: 13/888,734

(22) Filed: May 7, 2013

(65) Prior Publication Data

US 2013/0301896 A1     Nov. 14, 2013

Related U.S. Application Data

(60) Provisional application No. 61/644,561, filed on May 9, 2012.

(51) Int. Cl.
- *G06K 9/00*     (2006.01)
- *G06T 11/00*    (2006.01)
- *G01T 1/164*    (2006.01)

(52) U.S. Cl.
CPC ............... *G06T 11/005* (2013.01); *G01T 1/164* (2013.01); *G06T 11/006* (2013.01); *G06T 2211/416* (2013.01); *G06T 2211/424* (2013.01)
USPC ........................................... 382/131; 382/128

(58) Field of Classification Search
CPC ............... G01T 1/164; G06T 11/005
USPC ................................................... 382/128, 131
See application file for complete search history.

(56) References Cited

U.S. PATENT DOCUMENTS

| | | | |
|---|---|---|---|
| 7,215,735 B2 * | 5/2007 | Hagiwara | 378/19 |
| 2004/0092807 A1 * | 5/2004 | Breskin et al. | 600/407 |
| 2005/0058259 A1 | 3/2005 | Vija et al. | |
| 2010/0080339 A1 | 4/2010 | Austin et al. | |
| 2010/0243907 A1 | 9/2010 | Jansen et al. | |
| 2012/0314062 A1 * | 12/2012 | Hawman et al. | 348/142 |

OTHER PUBLICATIONS

C. E. Metz et al., "The geometric transfer function component for scintillation camera collimators with straight parallel holes," Phys. Med. Biol., vol. 25, No. 6, pp. 1059-1070, 1980.

H. O. Anger "Scintillation Camera with Multichannel Collimators," Journal of Nuclear Medicine 5, pp. 515-531, 1964.

(Continued)

*Primary Examiner* — Tom Y Lu
(74) *Attorney, Agent, or Firm* — Peter Kendall

(57) ABSTRACT

The point spread function of a multi-channel collimator is modeled in photon imaging. The geometric aperture used in the point spread function is expanded to account for penetration, scattering, and/or imperfections of the collimator. The aperture is broadened using a weight that is a function of the distance of the source from the collimator. Rather than scaling the point spread function itself, the geometric aperture used in the point spread function is scaled to an effective aperture. The distance and geometric constraints may be used to determine the geometric aperture, but an additional broadening occurs as a function of the distance to account for non-ideal photon paths of travel. This additional broadening may improve the fidelity with respect to measured data relative to purely geometric or Gaussian models.

20 Claims, 3 Drawing Sheets

(56) References Cited

OTHER PUBLICATIONS

X. Song et al., "Fast modelling of the collimator-detector response in Monte Carlo simulation of SPECT imaging using the angular response function," Phys. In Med. Biol. vol. 50, No. 8, pp. 1791-1804, 2005.

E C. Frey et al., Improved estimation of the detector response function for converging beam collimators, Phys. Med. Biol. 43, pp. 941-950, 1998.

* cited by examiner

EFFICIENT POINT SPREAD FUNCTION MODEL FOR MULTI-CHANNEL COLLIMATOR IN PHOTON IMAGING INCLUDING EXTRA-GEOMETRIC PHOTONS

CROSS-REFERENCE TO RELATED APPLICATION

This application claims the benefit of priority under 35 U.S.C. §119(e) of U.S. Provisional Patent Application Ser. No. 61/644,561, filed on May 9, 2012, the disclosure of which is incorporated herein by reference.

BACKGROUND

The present embodiments relate to photon imaging. In particular, the point spread function is modeled for use with a multi-channel collimator in photon imaging.

In single photon emission computed tomography (SPECT), photons are emitted directly from radio isotopes. Similarly, in positron emission tomography (PET), positrons are emitted, which interact with electrons to form photons (e.g., gamma rays). In both cases, the photons travel through the patient's body to a detector. Prior to detection, incident photons are projected onto the detector surface with a collimator so as to allow for recovery of geometric information about the scene being imaged. The collimator has an array of bores separated by highly attenuating septa. Each bore limits the acceptance angle of incident photons at that particular region of the detector, allowing the collimator to accomplish an orthographic projection of the scene onto the detector surface. However, due to the finite length and diameter of each bore, the region of space from which photons may be admitted is not an ideal line. The region is a cone that widens with increasing distance from the entry aperture. The acceptance regions of neighboring bores overlap, imposing a blur on images projected onto the detector.

In practice, depth-dependent blur is a complicated function of imaging distance and collimator geometry and may be characterized by the distribution of radiation impinging upon the detector from a point source, also known as the Point Spread Function (PSF). A given bore has geometric entry and exit apertures limiting the angle of any lines from a point source impinging on the detector. This region on the detector is characterized by the collimator's acceptance angle, or the angle spanning the two outer rays of the cone with its vertex at the focal point within the bore. The collimator dimensions (e.g., bore length and bore width, diameter or other aperture measure) and relative detector dimensions (e.g., the distance between the back of the collimator and average location in the detector where photons are absorbed to create an image) work together to determine the acceptance angle. As the imaging depth or source distance z increases, so does the width of the region subtended by this angle. A larger area of the scene being imaged contributes to a particular detector position, increasing the amount of blurring.

By modeling the PSF as part of a system matrix in reconstruction, the reconstruction of an imaged object from detected photons accounts for the blurring. However, using the PSF based just on the ideal apertures of the bore fails to account for penetration of the collimator septa by photons, scattering within the bores of the collimator and systematic defects or tolerance shifts in the collimator.

BRIEF SUMMARY

By way of introduction, the preferred embodiments described below include methods, systems, instructions, and computer readable storage media for modeling the point spread function of a multi-channel collimator in photon imaging. The geometric aperture used in the point spread function is expanded to account for penetration, scattering, and/or imperfections of the collimator. The aperture is broadened using a weight that is a function of the distance of the source from the collimator. Rather than scaling the point spread function itself, the geometric aperture used in the point spread function is scaled to an effective aperture. The distance and geometric constants may be used to determine the geometric aperture, but an additional broadening occurs as a function of the distance to account for non-ideal photon paths of travel. This additional broadening may improve the fidelity with respect to measured data relative to purely geometric or Gaussian models.

In a first aspect, a method is provided for point spread function modeling of a multi-channel collimator in photon imaging. A geometric aperture is determined as a function entrance and exit holes of the multi-channel collimator projected to an interaction plane of a detector. The geometric aperture is broadened with a factor that is a function of a distance from a source to the multi-channel collimator. The broadening of the geometric aperture provides an effective aperture. A point spread function is computed as a function of correlation of two effective apertures, representing the entry and exit bores of the collimator. Imaging is performed as a function of the point spread function.

In a second aspect, a non-transitory computer readable storage medium has stored therein data representing instructions executable by a programmed processor for point spread function modeling of a multi-channel collimator in photon imaging. The storage medium includes instructions for modeling a point spread function of the multi-channel collimator, the point spread function including correlation of two apertures, where each aperture is a function of a diameter and a location of a source relative to a detector, correcting the aperture with a factor, the factor being a function of a distance of the source from the multi-channel collimator, reconstructing an object from detected photons, the reconstructing being a function of a system matrix accounting for the point spread function with the corrected aperture in the correlation, and generating an image of the object from the reconstructing.

In a third aspect, an emission imaging system is provided. A detector is operable to detect emissions. A multi-channel collimator is adjacent to the detector such that the emissions pass through the multi-channel collimator. A processor is configured to determine a point spread function with an aperture on the detector caused by the multi-channel collimator and caused by an empirical weight, the aperture including locations of scattered, septa penetrating, or scattered and septa penetrating emissions due to the empirical weight, and configured to reconstruct an object as a function of the point spread function. A display is operable to display an image of the object.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
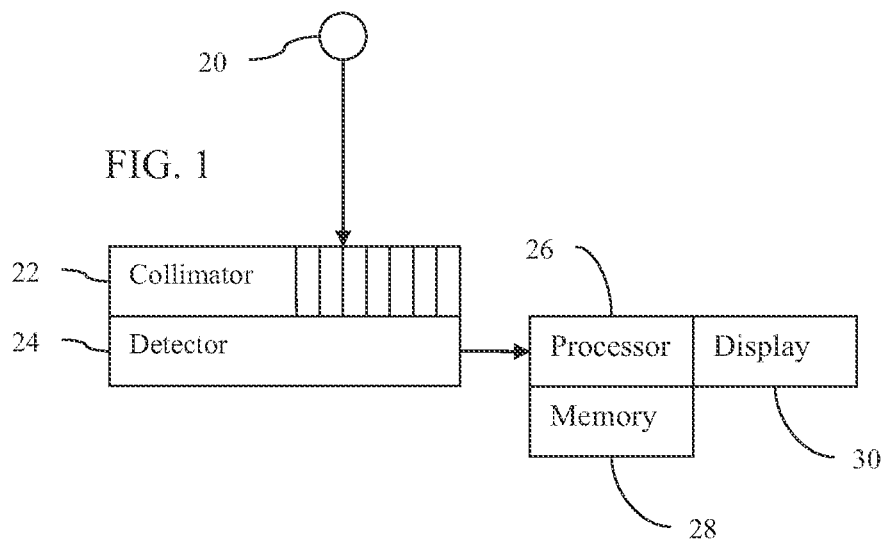
FIG. 1 is a block diagram of one embodiment of a system for point spread function modeling of a multi-channel collimator in photon imaging.

A distance and energy-depending penetration model is provided for imaging with a multi-channel collimator. Photon-based (e.g., SPECT, PET, or other) imaging suffers from blur imposed by the system's point spread function (PSF). In order to accurately model the physics of a multi-channel collimated photon imaging system, a model of the system's PSF is used. Typically, the PSF is modeled as a two-dimensional Gaussian at each imaging depth, where the acceptance angle is determined by the collimator geometry. In this framework, septal penetration is considered by increasing the acceptance angle slightly by a constant factor that is independent of depth and collimator type and based on the heuristic application of a physical constant (a photon's mean free path through the attenuating material). Inclusion of a more accurate non-compact, non-convex, non-separable PSF model is possible but computationally very cumbersome. This computational complexity arises because such models take much longer to derive (e.g. through lengthy Monte Carlo simulations or very detailed function fitting) and implement in the reconstruction, as the number of non-zero elements in the convolution kernel is increased dramatically.

A compromise between these two extremes, accounting for many of the non-ideal photons with little extra computational cost, is possible by computing the PSF as the correlation of the ideal geometric entrance and exit holes after a depth-dependent scaling. This accounts for many photons occurring due to physical non-idealities of the system, such as scattering by and/or penetration of the septa of the collimator, as most of these photons are detected immediately adjacent to, but outside of, the region defined by traditional geometric models. Via the scaling of the ideal apertures, an effective aperture is determined. In this framework, the PSF is no longer Gaussian, nor can the PSF be arrived at through calculations assuming nominal collimator and system dimensions and/or physical constants.

A multiplicative correction creates an effective aperture prior to correlation. The effective aperture is based on measured point source data for a given collimator, isotope, and distance. Instead of using a geometric aperture of the collimator, the effective aperture is used to compute the point spread function. By tailoring the properties of this correction, physical properties such as septal penetration and manufacturing defects maybe approximated or empirically determined to improve the model's fit to data. This effective aperture may, for example, manifest itself as a magnification to account for the broadening caused by collimator scatter and septal penetration. Thereby, the model provides accuracy better than pure geometric models, yet at a fraction of the computational burden of lengthy Monte Carlo simulations. Furthermore, the model fits well into existing projection or reconstruction implementation.

By incorporating a multiplicative correction factor to account for physical effects ignored by other point spread function models, better image quality may be provided. The improvement in the fidelity of the model may potentially lead to better image quality, lower noise levels, and higher quantitative accuracy in photon imaging systems where PSFs are used. Another advantage of the effective aperture model is simplicity. Aspects of depth and energy-dependence may be incorporated in traditional models using a simple multiplicative factor. More complete models may suffer from computational complexity precluding implementation in real-time or practical application for use on many different patients at different times in a medical facility.

FIG. 1 shows one embodiment of an emission imaging system. The system is a SPECT, PET, or other imaging system relying on emissions from radioisotopes imaged using a multi-channel collimator. In other embodiments, the imaging system is another type of photon imaging system. Whether the photons are emitted or not, the photons are detected for imaging.

The system, using hardware, software, or hardware and software, applies a point spread function with an aperture broadened beyond the geometrical aperture of the multi-channel collimator. The amount of broadening beyond the geometric aperture is a function of distance of the source from the collimator. The system implements the method of FIG. 2 or another method to compute the point spread function.

The system includes a multi-channel collimator 22, a detector 24, a processor 26, a memory 28, and a display 30. Additional, different, or fewer components may be provided. For example, the display 30 is not provided. As another example, the collimator 22 and detector 24 are not provided. Instead, the processor 26 and memory 28 are provided as a workstation or computer without connecting with the detector 24. Detector signals are transmitted to or loaded from memory 28 for computing and/or applying the point spread function.

A source 20 emits photons. Any of different sources of emissions may be provided. For example, the photons are emitted from a radioisotope. Any radioisotopes may be used. Different radioisotopes emit or result in photons having different energies that will exhibit different characteristics when interacting with the collimator 22. The radioisotope decays, resulting in either direct photon emission (SPECT) or positron interaction with electrons and subsequent photon emission (PET). Other sources of photons may be used in other embodiments.

The multi-channel collimator 22 is an array of apertures. For example, a honeycomb structure of lead septa or plates is provided. Other materials may be used. Each channel of the collimator 22 is an aperture or bore through which photons may pass. Rather than a hexagon shape, the aperture of the bores may have any shape. The septa are thin to minimize blockage of the photons. The multi-channel collimator 22 has a nominally uniform depth or height that is the same for each of the bores, but may vary from bore to bore due to manufacturing defects. Any multi-channel collimator may be used.

The multi-channel collimator 22 is adjacent to the detector 24. The collimator 22 lies in a plane above the detector 24 or between the detector 24 and the source. A gap may separate the collimator 22 from the detector 24. The collimator 22 covers the entire detector 24 or only part of the detector 24. The collimator 22 is placed to cause photons emitted from sources to pass through one or more bores generally along a perpendicular line to the detector and not pass through at other angles, such as +/−5 degrees from 90 degrees. Photons traveling at a sufficiently large enough angle away form orthogonal are blocked from the detector in order to enforce a geometrical relationship on the detected photons. Due to the bore aperture, photons traveling along ray lines over a range of angles may be accepted while photons traveling along ray lines at greater angles are blocked.

The detector 24 is operable to detect emissions. The detector 24 is an array of photo multiplier tubes or silicon avalanche photodiodes. The detector 24 detects photons. Crystals connected with the tubes or photodiodes convert the photons into light. The tubes or photodiodes detect the light. The location, energy, and/or timing of the detection are recorded or processed as a detected photon.

The detector 24 is planar, but may have a curved shape such as associated with a ring or cylinder. Similarly, the collimator 22 has the same shaped.

The processor 26 is a general processor, central processing unit, control processor, graphics processor, digital signal processor, application specific integrated circuit, field programmable gate array, amplifier, comparator, time-to-digital converter, analog-to-digital converter, digital circuit, analog circuit, timing circuit, combinations thereof, or other now known or later developed device for reconstruction, computing a point spread function, and/or applying a point spread function. The processor 26 is a single device or multiple devices operating in serial, parallel, or separately. The processor 26 is specifically designed or provided for computing point spread functions, but may be a reconstruction processor, main or general processor of a computer, such as a laptop or desktop computer, or may be a processor for handling tasks in a larger system, such as the imaging system. The processor 26 may perform other functions in addition to broadening an aperture used in a point spread function.

The processor 26 is configurable. The processor 26 is configured by software and/or hardware. For example, different software, firmware, and/or instructions are loaded or stored in memory 28 for configuring the processor 26. In one embodiment, the processor 26 is configured by instructions to implement one or more acts described in more detail below for FIG. 2.

The processor 26 is configured determine a point spread function. The point spread function is calculated using an aperture as represented on the detector 24. The collimator 22 and relative position to the detector 24 forms the geometric apertures. Rather than using a geometric aperture, the footprint of the aperture as projected into the interaction plane of the detector 24 is broadened to include locations associated with scattering, penetration of the septa, imperfections, geometric distortions, or other deviations of photons from the geometric aperture. The geometric apertures of the idealized multi-channel collimator 22 is expanded or broadened to include shadow or a larger region to account for photons deviating from the ideal.

The processor 26 multiplies the geometric aperture or aperture without the deviations from ideal (e.g., scattering and septa penetrating emissions) by a weight greater than one. Higher weights expand the size of the aperture by greater amounts. The weight is empirically determined for a given isotope and collimator 22 and is a function of distance from the source to the collimator 22. The point spread function is calculated using the expanded or effective aperture rather than the geometric aperture.

The processor 26 is configured to use the point spread function to reconstruct an object from which the emissions were received. The point spread function represents a probability distribution for receipt of a given photon on the detector 24 given the characteristics of the collimator 22 and the detector 24. The point spread function is used in the system matrix for reconstruction.

The processor 26 is configured to generate an image from the reconstructed object. Using multi-planar reconstruction, three-dimensional rendering, or planar imaging, an image of the object is created. The image is output to the display 32.

The display 32 is a monitor, LCD, plasma, flat screen, touch screen, projector, printer, or other device for displaying the image to a user. The display 32 receives the image from the processor 26 and presents the image of the reconstructed object to the user.

The memory 28 is a random access memory, graphics processing memory, video random access memory, system memory, cache memory, hard drive, optical media, magnetic media, flash drive, buffer, database, combinations thereof, or other now known or later developed memory device for storing data. The memory 28 stores detected events, such as PET or SPECT detected emissions from the detector 24. The geometric apertures of the collimator 22 or the geometric parameters necessary for the computation thereof are stored. A weighting function, such as a scalar for expanding the geometric aperture as a function of distance from the source to the collimator 22, is stored. The memory 28 stores data as processed, such as storing an effective aperture, system matrix, point spread function, and reconstruction information.

The memory 28 or other memory is a non-transitory computer readable storage medium storing data representing instructions executable by the programmed processor 26 for PSF modeling of a multi-channel collimator in photon imaging. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

Figure 2:
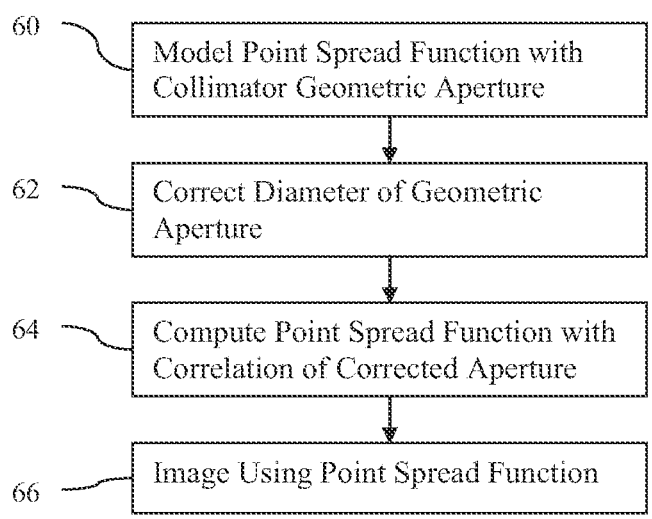
FIG. 2 is a flow chart diagram of one embodiment of a method for point spread function modeling of a multi-channel collimator in photon imaging.

FIG. 2 shows a method for PSF modeling of a multi-channel collimator in photon imaging. Rather than modeling just the photons that travel through the aperture of the multi-channel collimator, the photons detected after scattering, penetrating the septa, or other deviation from ideal are also modeled. The ideal geometric aperture as reflected on the detector 24 is broadened to account for these phenomena. The amount of broadening is based on a fit to experimental or calibration data and applied as a weight to the geometric aperture rather than using computationally inefficient theoretical or physics based modeling.

The method of FIG. 2 is implemented using the system of FIG. 1, a processor, a computer, or other device. The methods are performed in the order shown, but other orders may be used. For example, acts 62 and 64 are part of act 60. Additional, different, or fewer acts may be provided. For example, other acts related to use or creation of the system matrix, point spread function, and/or reconstruction are provided.

Figure 3:
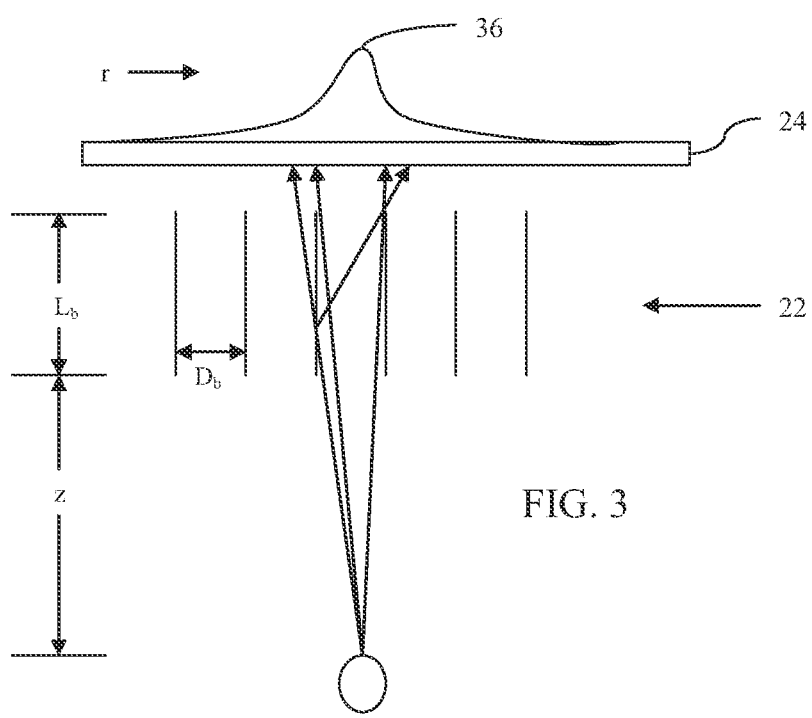
FIG. 3 illustrates a geometrical relationship of the point spread function of emissions from a source through a collimator and detected by a detector.

In act 60, the PSF of the multi-channel collimator and interaction with the detector is modeled. Traditional efforts at PSF modeling have focused on the portion of photons that encounter no collimator material en route to the detector surface. For example, FIG. 3 shows two ray lines from the source passing through the collimator 22 without interference.

These PSF models are determined by the system geometry and are therefore referred to as geometric models. The collimator 22 includes entry and exit holes for each channel. These holes define the bore and are the same size and shape, but may be different. The geometric aperture represents the bore of the multi-channel collimator projected to the interaction plane of the detector. With different distances of the source to the collimator, the aperture as reflected onto the interaction plane changes assuming only photons not intersecting the septa pass through. The geometric aperture is a function of the distance of the source from the collimator.

To approximate the PSF of a multi-channel collimator with the geometric aperture, the geometric response, which accounts for all photons reaching the detector surface that have no interaction with the collimator septa, is calcaulted. This model is based on the correlation of two scaled functions representing the geometric shape of the collimator aperture. This PSF model is represented as:

$$\phi_{AVG}(r, z) = \alpha(1/(4\pi(z+L_b)^2))[A_1(r, 2b/D_b) \text{ correlation } A_2(r, 2b/D_b)] \quad (1)$$

where r is a vector describing the source's location in space relative to the detector (e.g., transverse or lateral location on the detector), L is the bore length of the collimator, and z is the distance from the source plane to the collimator surface (see FIG. 3). The constant $\alpha$ is a normalization factor representing the number of collimator bores in the area of the correlation divided by this area over which the correlation is calculated. The functions subject to the correlation in the square brackets, $A_1(r, 2b/D_b)$ and $A_2(r, 2b/D_b)$ describe the aperture shapes and sizes at each end of the collimator bores and are unity where geometric transmission occurs and zero otherwise. They need not have the same shape or size but are treated so here for simplicity. This diameter of each $D_b$ is magnified by the factor $1/b = 1 + z/L_b$, which broadens the resulting PSF as the depth z increases. This scale is based purely on nominal system dimensions and is used for defining the geometric aperture and assumes an idealized situation. The point spread function includes two apertures which are correlated with one another, where the apertures are a function of a diameter of the collimator bores and a location of a source relative to a detector. $1/(4\pi(z+L_b)^2)$ scales the results of the correlation using the distance z. This term accounts for the decrease in the flux density of the photon emission with increasing distance due to the inverse square law.

Other PSF functions may be used. Other representations than diameter may be used to capture the shape of the collimator bore.

This model accurately captures the dominant geometrical aspects of the PSF, but relies on several assumptions. One assumption is that the physical phenomena of septal penetration and collimator scatter are insignificant. FIG. 3 shows a ray line passing through a septa to represent septal penetration and a ray line bouncing from the septa to represent scattering. However, the contribution of penetration and scatter of photons to the PSF may be significant (e.g., about 9-12% for high resolution collimators imaging 140 keV photons), particularly at close imaging distances. The over all effect is a broadening of the tails of the PSF cone 36.

A basic correction can be used whereby $L_b$ is shortened by a value related to the mean free path of a photon through the collimator material, but this effective bore length correction only accounts for penetration at the edges of septa and assumes no complete penetration. Furthermore, it is assumed static and independent of imaging depth.

In act 62, the geometric aperture is corrected with a factor. The factor is a weight. The weight broadens the geometric aperture, not just the diameter used in the aperture function. The apertures to be correlated are broadened by the factor to provide an effective aperture.

There is a finite probability that photons will pass through the septa and reach the scintillator crystal. This septal penetration manifests itself as broad, spider-like streaks in measured point source data. Furthermore, photons may interact with the collimator and be detected after a slight deflection, resulting in collimator scatter. Both phenomena result in an effective aperture at the interaction plane of the detector that is broader, resulting in greater energies away from the peak of the PSF (i.e., greater energies in the tail of the PSF). Other phenomena may result in a broadening of the geometric aperture. As these components are ignored by geometric models, accounting for these phenomena may improve quantification as well as potentially reducing noise at higher iterations in reconstruction by reducing model errors.

The broadening accounts for septal penetration and scattering of the multi-channel collimator. To simplify calculation, the broadening is limited to account for septal penetration through a single septal boundary (e.g., first order penetration). The relative magnitude of tail of the PSF (i.e. low-level PSF components outside of the central, ideal geometric region) captured by the broadened aperture is limited to magnitudes greater than those associated with photons penetrating more than one septa. Alternatively, the broadening may capture magnitudes from photons passing through more than one septa if increased accordingly. Additionally, the broadening may capture PSF components associated with other phenomena than penetration or scattering, such as energies associated with repetitive deviation from ideal of the collimator 22.

By scaling the bore diameter slightly and propagating this change into equation 1, a PSF model that accounts for many of the penetrating, scattering, or other phenomena photons is created. The bore diameter is increased by a correction factor, $\gamma(z)$, which is a function of z, the distance from the source plane to the collimator. Other definitions of z can be used, provided they include the distance from the source plane to the collimator. The correction factor is applied to the correlation model to magnify the diameter of each aperture function, which have already been scaled by the ideal geometric factor b. The aperture functions then become $A(r, 2b/D_b \gamma(z))$. This aperture function is expressed as an effective aperture. The PSF resulting from the effective aperture has a slightly broader skirt (i.e., greater magnitudes at larger lateral distances from the center of the PSF) and a reduced peak intensity relative to the function resulting from the correlation of aperture functions simply scaled by the ideal factor b.

The function relating the correction factor to the distance is determined experimentally. Given detections from a particular isotope or energy, the function is determined as a fit to that detection data. For example, a number of $^{99m}T_c$ point source projections are taken using a detector equipped with a collimator of interest. Different weighting is provided for different isotopes, collimators, and/or detectors. The weighting may be part specific (fit to data for a given collimator) or product specific (fit to data for a type of collimator).

The source is centered on the detector at each imaging depth, such as spanning from 10 cm to 50 cm in 5 cm increments. Additionally, $^{57}C_o$ data is taken at a depth of 35 cm with transverse offsets of −10, −5, 0, +5, and +10 cm in the horizontal (r) direction. Following this, an objective function is established by which a new magnification factor γ is fit to the $^{99m}T_c$ data at each depth z. The function seeks to minimize a cost, such as a Mighell $\chi^2$ error, between the data and model.

$$\gamma(z)=\text{argmin}_\gamma \Sigma_i (d_i+\min(d_i,1)-\phi_{AVG}(r_i,z,\gamma))^2/(d_i+1) \quad (2)$$

where $d_i$ is the measured value at the ith pixel, and $\phi_{AVG}(r_i, z, \gamma)$ is equivalent to the average PSF evaluated at transverse coordinates described by the vector $r_i$ corresponding to the center of the ith data pixel. The apertures are scaled by γ and b', as derived from the imaging depth z. Other energies may be used for fitting. Other tranverse offsets, distance, and distance increments may be used.

The optimization is carried out using any approach, such as Matlab's fminsearch routine, which is itself an implementation of the Nelder-Mead simplex method. Transverse shifts and a scalar amplitude parameter are also included in the fit to avoid biasing, but are not expressed in equation 2 for clarity. The initial value of γ is set to unity, and the transverse shift is initialized to the centroid of the data after thresholding at 10%, which prevents septal penetration tails truncated by the limited field of view from skewing the centroid measurement. As the Matlab/MEX function written to generate $\phi_{AVG}(r_i, z, \gamma)$ returns a full PSF array normalized to sum to one, the scalar amplitude parameter is initialized to the sum over all pixels of d.

After γ(z) is fit at each imaging depth, the resulting values are in turn fit to the following exponential-plus-constant function:

$$\gamma(z)=a_0+a_1 e^{-za_2}. \quad (3)$$

The decaying model reflects the assumption that the influence of these factors is more significant at close imaging distances where the footprint of the geometric PSF is small and fades to some asymptotic value as the geometric region becomes dominant. The exponential-plus constant model is chosen based on the National Electrical Manufacturers Association (NEMA) standardized protocol for the estimation of a collimator's septal penetration and collimator scatter fraction. Other models or fitting functions may be used.

Figure 4:
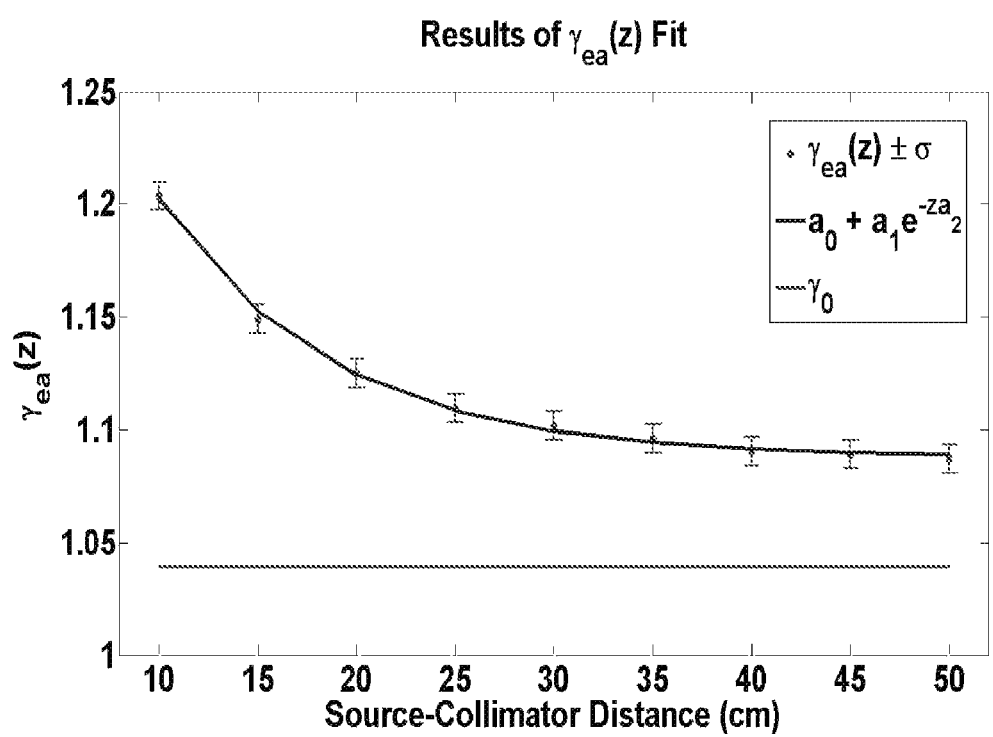
FIG. 4 is a graph showing an example factor as a function of distance for broadening an aperture.

To estimate the variance of the weight factor, γ, scaling coefficients are also estimated from the five transverse $^{57}C_o$ measurements, which should theoretically return a uniform set of γ values. The error bars in FIG. 4 represent ±σ, as derived from these transverse measurements. The results of both fits are shown in FIG. 4. The aforementioned traditional constant correction $\gamma_o$ appears as a straight line at about 1.04, while the curved line represents the proposed factor as a function of depth or distance.

By evaluating equation 3 with the appropriate $a_0$, $a_1$, and $a_2$ (e.g., 1.0878, 0.3586, and 0.111, respectively, for $^{99m}$Tc and LEHR) at the desired depth z cm, the effective aperture PSF model is calculated as described in equation 1 modified with the factor:

$$(\phi_{EA}(r,z)=\alpha(1/(4\pi(z+L_b)^2))[A_1(r,2b/(\gamma(z)D_b))\text{ correlation }A_2(r,2b/(\gamma(z)D_b))]$$

or represented more generally as:

$$\phi_{EA}(r,z)=C[A_1(r,2b/(\gamma_1(z)D_{b,1}))\text{ correlation }A_2(r,2b/(\gamma_2(z)D_{b,2}))]$$

where C is a normalization constant that can be chosen to, for example, provide absolute units of photons counted per unit time per unit area or ensure that the entire function sums to a particular value. $A_1(2b/(\gamma_1(z)D_{b,1}))$ and $A_2(2b/(\gamma_2(z)D_{b,2})$ are the aperture functions of the entry and exit bores, respectively. As these functions may have different shapes and diameters $D_b$, their corresponding correction factors $\gamma_2(z)$ may also be different. Other effective aperture PSF models may be provided.

As shown in FIG. 4, the factor is a function of a distance of the source from the multi-channel collimator. The factor has a lesser value for greater distances. For this isotope, the factor is between one and two, such as between 1.5 and 1.05 or 1.25 and 1.08. Greater or lesser ranges may be provided.

The factor magnifies the diameter or foot print of the geometric aperture. To use the factor, a look-up table or equation representing the function of FIG. 4 is used. A distance is input to determine the factor. The geometric aperture is multiplied by the factor prior to correlation. In other embodiments, addition, division, or other functions are used to alter the aperture.

Applying these factors to the traditional average geometric model formalized by Barrett and comparing the reduced-chi-square error and sum of squared differences with respect to the experimental data shows improvement of the standard model's fit to the data despite not rigorously accounting for physical phenomena. The correction is particularly attractive due to ease of implementation. A simple look-up table or equation is used. The multiplication of the diameter or aperture by the correction factor may be incorporated into any framework using the correlation-based model for the point spread function.

The same correction factor is applied as a scalar multiple to scale the diameter regardless of the transverse or lateral location of the source relative to the detector. Only differences in the distance result in different values of the correction factor. In other embodiments, γ(z) may be decomposed into two components to scale two axes of PSF independently to compensate for asymmetric effects arising, for example, from defects in the manufacturing process. γ(z) therefore becomes [γ(z, $r_1$) γ(z, $r_2$)], a two element vector with $r_1$ and $r_2$ denoting the axes along which the scaling of the aperture occurs. In general, the effective aperture may be tailored for the specific application to account for any of various physical non-idealities not accommodated by the purely geometric model.

In act 64, the PSF is computed. The PSF uses the effective aperture rather than the geometric aperture. The effective aperture is used for correlation. By using the effective aperture, the resulting point spread function has a broader profile but lesser peak than using the geometric aperture. The point spread function has a broader skirt. Since exact physics or theoretical modeling are not used, at least some lower intensity portions of the tail may not be accounted for in the broader profile. This allows use of a simple scaling factor, which may be computationally efficient and maintains a good fit to data in the geometric region.

Prior to the correlation computation, the ideal geometric apertures are scaled based on the distance from the source to the collimator. The additional application of the effective aperture correction is based, at least in part, on the distance from the source to the collimator as well. The geometric scaling component b applied to each aperture depends on the distance and is strictly defined by geometric constants (e.g. z, $L_b$, $D_b$, etc.). The distance-dependence of the further spreading incorporated via the effective aperture is based on other physical factors that are not directly computable (e.g. septal penetration, collimator scatter, and manufacturing defects) and is hence derived separately from the fit to measured data.

The two distance-dependent scaling factors may then be combined, accounting for both the geometric shift as well as non-ideal phenomena in one quantity.

In act 66, imaging is performed as a function of the point spread function. The point spread function has an effect on the imaging. The point spread function is used in reconstruction of the object from which the emissions are received.

For reconstruction, photons arriving at the detector are detected. In response to an emission of gamma rays (photons), arrays of crystals contacted by the gamma rays generate light. The detectors, in response to the light, generate signals. The signal causes the detector to generate a voltage. The detected signal is an analog signal or a digitally sampled signal. The detection of photons occurs for other events detected at the same and/or different detectors.

The detected photons are from along a line or range of angles. Reconstruction resolves a plurality of detected events into an object. Part of reconstruction accounts for the operation of the system. This operation is reflected in the system matrix. The point spread function calculated with the aperture correction is included as part of the system matrix.

Any reconstruction approach incorporating PSF compensation may be used. In one embodiment, Maximum Likelihood-Expectation Maximization (MLEM) reconstruction is used. Due to quick convergence for quadratic objective functions, the Conjugate Gradient (CG) algorithm is used to optimize the Mighell $\chi^2$ error metric. Other reconstruction algorithms incorporating the PSF may be used.

MLEM is an iterative algorithm with a system matrix H. The system matrix describes the transformation from the image to the projection space. While the estimator allows an iterative algorithm to model the underlying statistics of the Poisson image formation process, H allows the algorithm to compensate for other physical factors. The properties of the system matrix are important during reconstruction, as errors in the system matrix may prevent the algorithm from approaching the desired solution as well as propagating -and potentially magnifying -errors through the reconstruction process. These two problems are coupled, as algorithms are rarely allowed to run until convergence, precisely because the second issue may lead to a rapid accumulation of image noise, rendering images diagnostically useless.

Ideally, H would be some permutation of the identity matrix, ensuring a well-conditioned reconstruction problem from data formed by ideal, geometric projections. However, in reality, effects such as attenuation, scatter, and the fact that there are generally many voxels that contribute to a single detector pixel, the matrix is quite ill-conditioned and has many off-diagonal elements. One of the largest contributors to the structure of H is the collimator's point spread function, whose blurring manifests itself as a broad, non-stationary kernel embedded within H.

One advantage of incorporating the PSF into the system matrix enables resolution recovery by adding a deconvolution element to the reconstruction process. Proper PSF modeling also leads to a reduction of quantitative bias due to misallocation of acquired counts. Furthermore, fewer errors in H should reduce successive noise build up, allowing the reconstruction to be run for larger numbers of iterations and take greater advantage of the aforementioned resolution recovery and bias reduction.

Once the object is reconstructed, an image of the object is generated. Any imaging technique may be used. For example, the object is represented by data in a three-dimensional Cartesian coordinate space. The data is used to render an image with three-dimensional rendering. Alternatively or additionally, data for one or more planes is extracted and used to generate an image.

Using the effective aperture may allow for efficient computation as compared to measuring and using an actual PSF over an entire field of view of the detector. The detector may be 40×50 cm, for example. The actual PSF is non-convex because of the effects that occur (e.g., septal penetration and scattering. By using the more compact, convex effective aperture, the footprint on the detector is relatively small (e.g., a few % increase over the geometric model). For example, at z=15 cm, the effective aperture model yields a kernel having 12.59×11.39 mm, which is smaller than a more complete or complex model for the entire field of view (e.g., 533×387 mm). The result is computational efficiency in computing the PSF and performing reconstruction as compared to modeling the entire PSF. The effective aperture approach may have better computation times than the complex model approach.

Different types of imaging may be provided. For PET or SPECT imaging, the selection of the particular isotope may correspond with the function, organ, or other information of interest. The imaging is specific to the type of isotope. Since the correction factor may be different for different isotopes, the correction function appropriate for the given isotope is used.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. In a non-transitory computer readable storage medium having stored therein data representing instructions executable by a programmed processor for point spread function modeling of a multi-channel collimator in photon imaging, the storage medium comprising instructions for:
    determining a geometric aperture as a function of an entrance hole or an exit hole of the multi-channel collimator scaled based on geometric constants;
    broadening the geometric aperture with a factor that is a function of a distance from a source to the multi-channel collimator, the broadening of the geometric aperture providing an effective aperture;
    computing a point spread function that is a function of a correlation of the effective aperture with another aperture of the multi-channel collimator; and
    imaging as a function of the point spread function.

2. The non-transitory computer readable storage medium of claim 1 wherein determining comprises accounting for photons passing through the multi-channel collimator with no interaction with the multi-channel collimator.

3. The method of claim 1 wherein computing the point spread function includes scaling a result of the correlation with the effective aperture as a function of the distance.

4. The non-transitory computer readable storage medium of claim 1 wherein broadening comprises accounting for septal penetration and scattering of the multi-channel collimator.

5. The non-transitory computer readable storage medium of claim 4 wherein broadening comprises accounting for the septal penetration through a single septal boundary.

6. The non-transitory computer readable storage medium of claim 1 wherein broadening comprises magnifying a diameter of the geometric aperture.

7. The non-transitory computer readable storage medium of claim 1 wherein broadening comprises broadening with the factor being between one and two for all distances.

8. The non-transitory computer readable storage medium of claim 1 wherein broadening comprises broadening with the factor comprising a fit to experimental data of a particular isotope acquired using a particular collimator, and wherein imaging comprises imaging with the particular isotope and the particular collimator comprising a same type as the multi-channel collimator.

9. The non-transitory computer readable storage medium of claim 1 wherein computing comprises computing the point spread function with the effective aperture to include a broader profile than computing with the geometric aperture, the broader profile failing to include at least some lower intensity tail portion.

10. The non-transitory computer readable storage medium of claim 1 wherein computing comprises providing the point spread function with a broader skirt and reduced peak as compared to computing the point spread function as a function of correlation with the geometric aperture.

11. The non-transitory computer readable storage medium of claim 1 wherein broadening comprises multiplying the geometric aperture with the factor.

12. The non-transitory computer readable storage medium of claim 1 wherein broadening comprises broadening with the factor, the factor being a function of a two-element vector, where an asymmetric broadening along two transverse axes is achieved.

13. The non-transitory computer readable storage medium of claim 1 wherein imaging comprises reconstructing an object represented by emissions detected by the detector, the reconstruction using the point spread function.

14. In a non-transitory computer readable storage medium having stored therein data representing instructions executable by a programmed processor for point spread function modeling of a multi-channel collimator in photon imaging, the storage medium comprising instructions for:

modeling a point spread function of the multi-channel collimator, the point spread function including entry and exit apertures subject to a correlation where the apertures are a function of respective diameters and a location of a source relative to a detector;

correcting the apertures with a factor, the factor being a function of a distance of the source from the multi-channel collimator;

reconstructing an object from detected photons, the reconstructing being a function of a system matrix accounting for the point spread function with the corrected apertures in the correlation; and generating an image of the object from the reconstructing.

15. The non-transitory computer readable storage medium of claim 14 wherein modeling comprises accounting for distribution of photons traversing the multi-channel collimator with no interaction with the multi-channel collimator and scaling a result of the correlation as a function of the distance.

16. The non-transitory computer readable storage medium of claim 14 wherein correcting comprises broadening the apertures to include septal penetration and scattering, the factor being a function of isotope for the photon imaging.

17. The non-transitory computer readable storage medium of claim 14 wherein correcting comprises looking-up the factor based on the distance, the factor being between one and two, and multiplying the apertures by the corresponding factor.

18. The non-transitory computer readable storage medium of claim 14 wherein correcting comprises correcting with the factor being a function of two elements such that the factor broadens the apertures along two axes separately.

19. An emission imaging system comprising:
a detector operable to detect emissions;
a multi-channel collimator adjacent to the detector such that the emissions pass through the multi-channel collimator;
a processor configured to determine a point spread function with an aperture on the detector caused by the multi-channel collimator and with an empirical weight, the aperture including locations for scattered, septa penetrating, or scattered and septa penetrating emissions due to the empirical weight, and configured to reconstruct an object as a function of the point spread function;
a display operable to display an image of the object.

20. The emission imaging system of claim 19 wherein the processor is configured to determine the point spread function by multiplying a geometric aperture without the scattered and septa penetrating emissions by a weight greater than one.

* * * * *